July 9, 1963   F. P. WILLCOX ETAL   3,096,700
DOUBLE TORSION SPRING ENERGY-STORAGE PHOTOGRAPHIC SHUTTER
Filed Jan. 30, 1959   3 Sheets-Sheet 1

INVENTOR
F. P. WILLCOX
L. F. WELANETZ

BY Homer R. Montague
ATTORNEY

Inventor
F. P. WILLCOX
L. F. WELANETZ
By Homer R. Montague
Attorney

3,096,700
DOUBLE TORSION SPRING ENERGY-STORAGE PHOTOGRAPHIC SHUTTER

Frederick P. Willcox, Old Westbury, N.Y., and Ludolph F. Welanetz, Bethesda, Md., assignors to Fairchild Camera and Instrument Corporation, a corporation of Delaware
Filed Jan. 30, 1959, Ser. No. 790,083
10 Claims. (Cl. 95—63)

This invention relates to high-performance photographic camera shutters, and specifically to a novel type of shutter providing good optical and power-utilization efficiencies, long life, relative simplicity and dependability in arduous use conditions, and related advantages.

The conditions under which modern photographic equipment is required to operate impose very stringent specifications, both in terms of optical performance and mechanical operation. A good example of this trend is in the field of aerial photography, especially military reconnaissance photography, in which low flying altitudes and high craft speeds combine to necessitate high film speeds and short exposures which must be repeated at very short intervals. Adding to these the need for large-aperture lenses results in mechanical requirements which push the limits of material strength and all of the other design parameters. As compared with amateur camera shutters, a typical aerial camera design will require a clear (open) aperture of three and a half inches, an equivalent exposure time of 1/400 second, and a cycle (exposure) repetition rate of perhaps several per second. All of these values point in the direction of high acceleration rates of the parts, and correspondingly high input or operating power. At the same time, the shutter must be strong enough to withstand such high accelerations and forces for a life of perhaps 25,000 exposures, at varying temperatures and under other generally adverse working conditions.

A good example of a previous design of high-performance shutter is the shutter known commercially as the "Rapidyne" shutter described in U.S. Patent No. 2,691,331 of October 12, 1954, issued to the present inventors and assigned to the owners of the present application. That shutter employed two complete sets of multiple shutter blades, one set for opening the exposure aperture and a second set for closing the aperture. The blades of each set were connected for conjoint operation by a so-called daisy chain of lengthy links and interspersed triangular sectors or fans, each blade being linked to one of the fans. It was found to be possible to operate this arrangement at high speeds, provided sufficient driving power was applied. However, the necessity for bringing the blades and their associated parts to a complete stop in a very short interval required elaborate braking measures which wasted a considerable part of the input mechanical energy; such measures for the "Rapidyne" shutter are described in the present inventors U.S. Patent No. 2,803,181 of August 20, 1957, also assigned to the owners of this application. A further limitation on the "Rapidyne" shutter lay in the necessity for completely rewinding both springs which drove the respective sets of shutter blades, before a following exposure could be made. This limited the rate at which successive exposures could be made.

The present invention covers a high performance shutter in which, again, two separate sets of shutter blades are used, and during any given exposure one set acts to open the aperture, and the other set acts to close the aperture. However, by the use of novel driving springs for the two sets of blades, which springs are symmetrical with reference to their neutral or unwound conditions, the opening and closing functions are interchanged after each exposure. That is, the blade set which acts to open the aperture during a given exposure, will act as the aperture-closing blade set for the following exposure, and vice versa. This eliminates the need for a rewind in the usual sense of that word, and hence makes it possible to produce successive exposures at a higher rate.

Additionally, the use of the new form of symmetrical drive springs makes it possible to use the spring resistance, which builds up from the neutral position of the spring (midway between its oppositely tensioned conditions) as the braking force which will decelerate the parts to a smooth stop without any frictional or dissipative effort. Means are provided to "catch" the spring at about its point of maximum tension following this deceleration, which is the point at which its velocity becomes zero, so that the spring is now partly wound up, although in the sense or direction opposite to that in which it was wound before. The spring can now be fully wound, in that opposite sense, by the application of only a moderate amount of winding power; sufficient, in fact, only to overcome the inevitable friction and windage losses which occurred during the travel portion of the cycle. At this point, the spring and blade set is in condition for a following exposure, but with its function reversed; that is, if during the actions just described the blade set under discussion was the "opening" set, then during the following exposure it will be the "closing" set; and the function of the second set of blades will likewise be reversed.

Some of the basic advantages of the invention will be appreciated from the foregoing rather simplified description of the operation; but the full realization of the possibilities of that general design involve other structural or design features. Among these are the optimum form of the symmetrical torsion springs themselves, which according to the invention preferably take the form of a compound torsion bar and cage, of a sort of folded construction to conserve axial length and to obtain the full use of the strengths of modern materials; an improved form of power release mechanism which permits the use of a sensitive and fast-acting tripping control to initiate each exposure; a novel form of latch for holding and releasing the cocked springs under control of the release mechanism, and a simplified daisy chain and blade assembly.

Some of the advantages of the new construction are not exclusively related to shutters employing two sets of blades, but can be applied with advantage to single shutters, or shutters using the same set of blades for the opening and closing functions, as will be obvious to those skilled in this art. Reference herein to the single preferred embodiment disclosed in detail are therefore not to be considered as limiting the inventive concepts to that complete design, but rather are to be taken as employed for the purposes of explanation and understanding.

Briefly, then, the present invention provides a dual shutter in which by means of symmetrically-acting drive springs the functions of the two sets of blades are interchanged alternately from exposure to exposure, and in which the power usually wasted in the decelerating actions is stored up and applied, together with an addendum to cover the losses, to operate the same blade set in the next following exposure.

The above and other objects and advantages of the invention will be made more apparent as this specification proceeds with a detailed description of a preferred embodiment of the invention, taken in connection with the appended drawings, in which.

Figure 1:
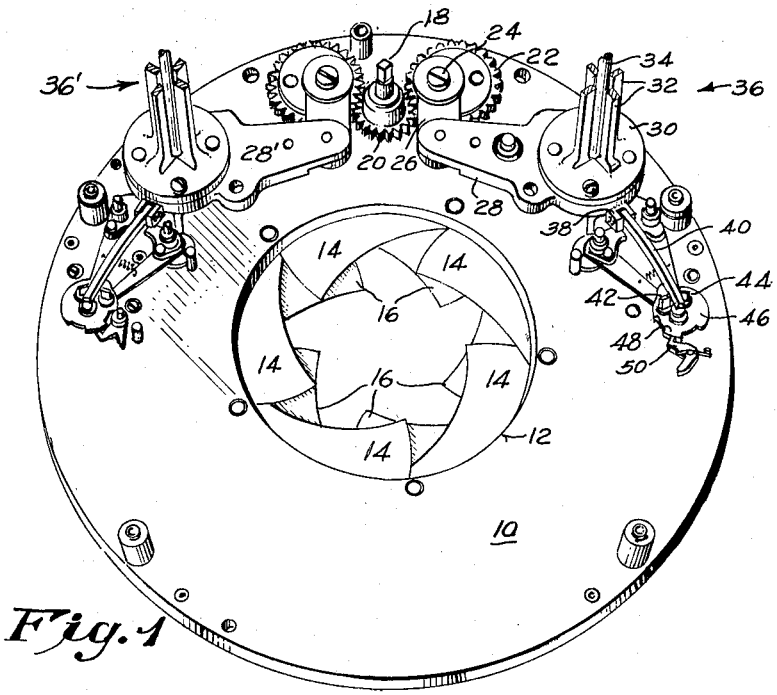
FIGURE 1 is a fragmentary perspective view of certain essential parts of the descriptive embodiment of the invention, shown in an intermediate position with the shutter blades occupying a position during an actual exposure, with the exposure aperture partly open; that is, one set of blades part way through its opening movement, and the other set part way through its closing movement.

Referring first to FIGURE 1 of the drawings, there is shown a shutter mounting plate 10 having a central aperture 12 which conforms to the exposure aperture or lens opening of the optical system of the camera. Two sets of pivoted shutter blades 14 and 16 are suitably carried beneath plate 10, the blades of each set being substantial duplicates of one another and formed of very thin but strong material, such as clock-spring steel a few thousandths of an inch thick. The blades of the two sets are also similar in shape, but reversed in the sense of mirror images, as the making of an exposure will involve the rotation of the blades of one set in an angular sense opposite to that of the blades of the other set. Since the interchange of opening and closing functions after each exposure makes it impossible to distinguish between an opening set and a closing set, we will refer to the blades as the upper set and the lower set, with reference to their positions in FIGURE 1.

The upper set of blades 14 is under the control of mechanism shown to the right of the center line of FIGURE 1, and the lower set 16 is under the control of mechanism to the left of that center line. With few exceptions, these mechanisms are also enantiomorphously related, and operate in exactly similar fashions. Therefore, to make the description as brief as possible, only one set of mechanism will be described in detail, but where helpful the corresponding parts of the opposite set will be identified by the same numerals primed.

A centrally disposed power input shaft 18, arranged to be driven as required, by mechanism to be described below, is secured to a pinion 20 which meshes with a drive gear 22 mounted on plate 10. Pivotally secured at an eccentric point on gear 22, as by a shoulder screw 24 and washer, is a link 26 whose opposite end is pivotally connected to a rewind arm 28 also suitably journalled on plate 10. Firmly fastened to arm 28, and concentric with its journal axis, is the bottom flange 30 of a torsion cage formed by a plurality (herein four) of upstanding elongated bars 32 formed of tough spring metal and preferably an integral fabrication with flange 30. At their upper ends, not shown in FIGURE 1, these bars are secured to the upper end of a torsion bar or rod 34 encompassed by the bars 32. The lower end of rod 34 passes downward through flange 30 and plate 10 for connection with a blade latch and drive mechanism to be described. The cage bars and rod thus form a compound torsion spring designated as a whole by numeral 36, having the property of being torsionally wound in either angular direction away from its neutral or unstressed condition. Such a unit possesses only very low internal friction losses or hysteresis, and can be made to have a very high spring constant; that is, a large force per unit of angular deflection.

A slotted yoke 38 integral with rewind arm 28 firmly mounts one end of a leaf spring (here shown as a spring pack) 40, the outboard end of which is received between two spaced drive posts 42 and 44 secured on a striker plate 46 pivoted on plate 10. A latch formation 48 on the striker plate 46 cooperates with a striker plate latch 50 urged by a spring (not shown in FIGURE 1) into engagement with the latchable striker plate. These parts are in control of the upper blades 14, and are duplicated to the left of the center line of FIGURE 1 for control of the lower blades 16.

Figure 2:
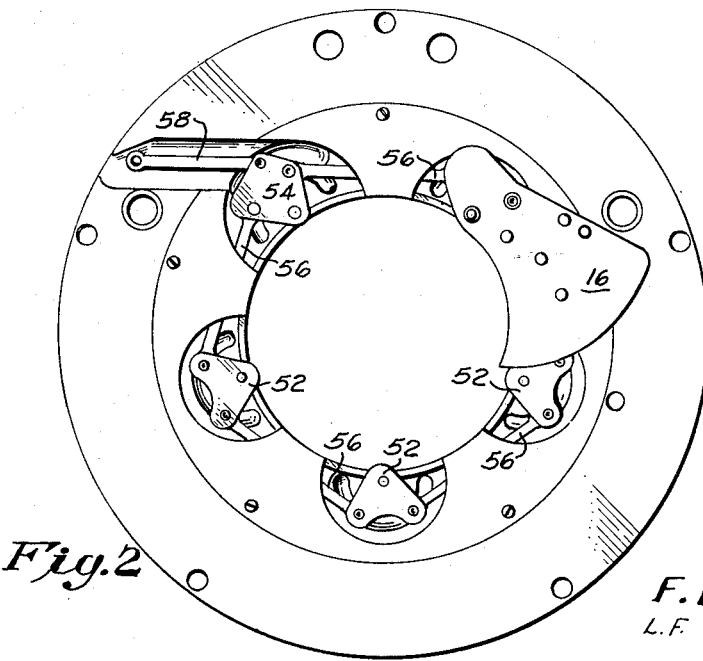
FIGURE 2 is a plan view, with parts omitted for clarity, showing a lower level of the shutter of FIGURE 1.

FIGURE 2 of the drawings shows a lower level in the shutter, many of the parts having been removed to expose a single one of the lower blades 16, just entering (or leaving) the clear exposure aperture of the shutter. Each set of blades, in the present embodiment of the invention, includes five blades having a total angular motion of about 75 degrees. A daisy chain is indicated in FIGURE 2 as comprising, for the lower blades 16, a series of five pivoted fans including four triangular-shaped fans 52 and a trapezoidal power input fan 54, interconnected by long links such as indicated at 56. In this shutter, as contrasted with those shown in the prior patents mentioned above, the fans mount the shutter blades directly, the control of acceleration and deceleration obtained by the compound torsion springs being such as to eliminate the need for a link connection from each blade to its corresponding fan. Usually blade reenforcing structure may be applied to each blade particularly adjacent its stationary pivot and the drive points, and the power input fan 54 will have an extra link 58 for connection to the spring drive for that set of blades.

Figure 3:
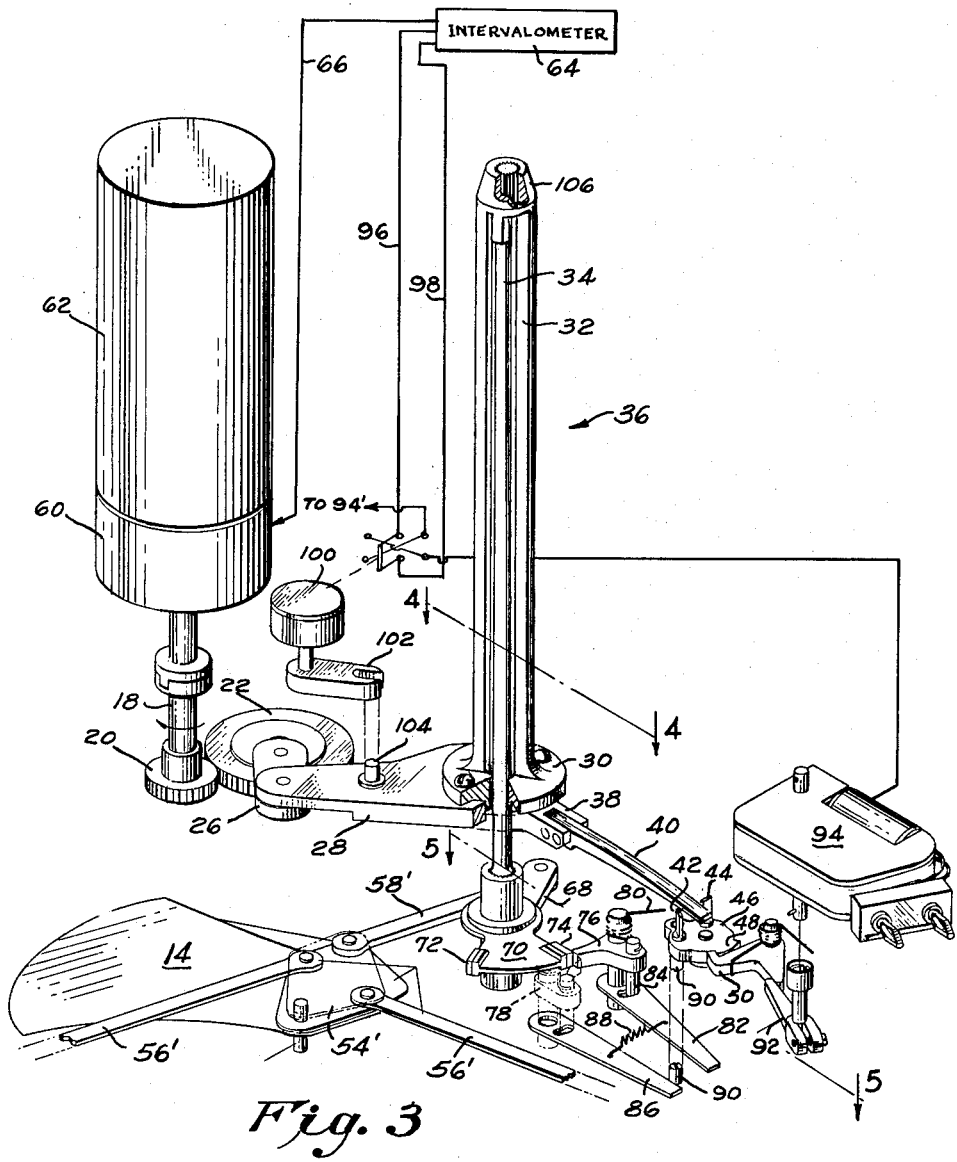
FIGURE 3 is a fragmentary, perspective, partly exploded view of the main parts associated with one set of the shutter blades.

Turning now to FIGURE 3 of the drawings, wherein like parts have the same numerals as applied above, a more detailed description and explanation can be given. Main drive shaft 18 is connected through a suitable coupling to a magnetically operated one-revolution clutch 60 of conventional construction, its input shaft being continuously rotated in one direction by the motor 62. It may here be noted that the timing of the various phases of the shutter operation is controlled by a pulse source indicated schematically at 64, one function of which is to energize clutch 60 to drive gear 20 through one revolution, commencing after completion of each exposure, to furnish the make-up energy to both torsion spring units. This pulse is conducted to clutch 60 over lead 66.

Gears 20 and 22 have a two-to-one ratio, so that one turn of gear 20 turns gear 22 a half turn, always in the same rotational direction. As has been stated, this amount of turning of the gear 22 will supply the make-up torque, but it would not suffice to fully wind the torsion bar unit from its wholly run-down condition. At initial assembly, or after any complete run-down of the torsion spring unit or units, it is necessary to supply initial cocking energy. However, FIGURE 3 shows the parts with torsion bar unit 36 fully wound in one direction, resulting from one-half turn of gear 22 in the clockwise direction, and acting through link 26 and rewind arm 28 to give flange 30 an additional few degrees of motion beyond that imparted to it during its previous action as a decelerating spring for the previous phase of the operation. Thus, FIGURE 3 shows a blade 14 in "open condition," cocked and ready to act as a closing blade during the next exposure. Hence, during the next preceding exposure, blade 14 was an opening blade, and during its opening motion the pivotal connection between gear 22 and link 26 lay on the far side of the gear axis; rewind arm 28 was then about 12 degrees clockwise from the position shown in FIGURE 3. But the daisy chain and blades 14, in finishing their movement past the neutral tension point of the torsion unit, wound the center rod 32 of the unit sufficiently to store considerable energy, expressed as spring tension, in the unit. The balance needed to rewind the unit fully was supplied by the one-half revolution of gear 22 as just described.

As will be clear from what has been said, the lower end of center rod 34 of the compound torsion bar is connected to drive one blade set (14) through the medium of a drive crank 68 secured to the rod 34 and pivoted to the power link 58'. The drive crank 68 is also secured to a stop cam 70 having hardened steel or carbide latch faces 72, 74 of which the latter is shown as engaging a blade hold-open latch 76. When blades 14 have moved to their shutter-closing position, stop cam 70 will have brought latch face 72 into position to be engaged by a blade hold-closed latch 78, shown in phantom lines for clarity in this view.

Hold-open latch 76 is mounted on a fixed pivot and urged to the shown position by a spring 80. Pivoted on the same fixed pivot is a latch actuator arm 82 slotted to receive an operating pin 84 on latch 76. When arm 82 is moved counter-clockwise, after a slight idle motion it moves pin 84 and releases latch 76 from latch surface 74 to initiate the closing motion of blades 14. A similar actuator arm 86 is provided for latch 78, and the arms are urged toward one another as by a spring 88. The parts are designed so that when either actuator arm releases its latch, it has sufficient travel also to hold the latch out of contact with the rim of stop cam 70 so as not to impede the motion of the parts.

Operation of the latches in proper sequence is obtained under the control of a striker pin 90 extending downwardly from the striker plate 46 already described as carrying the spaced drive posts 42 and 44. The rewind motion of gear 22 and rewind arm 28 has urged leaf spring 40 against the pin 44 and hence urges striker plate 46 clockwise, but it is held against motion in this direction by the striker plate latch 50 which is hooked on the latch formation 48 and held there by a spring, as shown. A tail on latch 50, when rotated by a trip arm 92, causes release of the striker plate which is under tension from leaf spring 40, and hence moves striker pin 90 to engage actuator arm 82 and release latch 76 in a very positive manner. The construction thus provides a power-operated release mechanism which is automatically rewound, as required, from the same motor 62 which supplies the make-up energy for the main drive spring units.

Tripping of the trip arm 92 is controlled by a rotary electromagnet 94 of conventional form, and a duplicate thereof controls the identical motions of the other set of blades 16, not shown in FIGURE 3. However, since the functions of the two sets of blades are reversed after each actuation, it is to be noted that these trip magnets have to be energized in the opposite order depending upon which set of blades is opening and which is closing. The pulse source 64 supplies merely a sequence of spaced pulse pairs to its output leads 96 and 98, in alternation, and the connections of these leads to the proper trip magnets is accomplished by a simple reversing switch 100, operated by a fork 102 and engaging a pin 104 on the rewind arm 28. The switch is required on one side only, no duplicate being provided for the corresponding rewind arm 28'. It will also be noted that the latch formation 48 on striker plate 46 is such that latch 50 can engage either end of the formation, so as to latch the striker plate after one cycle of its motion in either direction. Release from either position is accomplished by the trip magnet 94.

Figure 4:
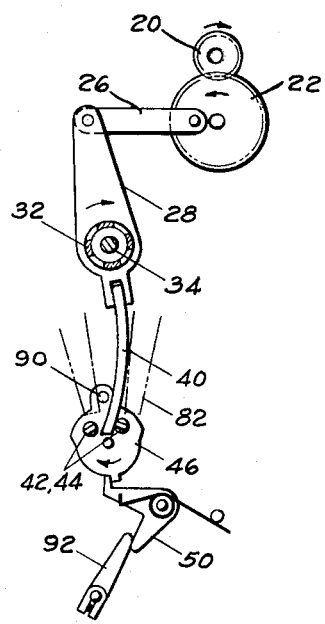
FIGURE 4 is a diagrammatic view of the relative positions of certain of the FIGURE 3 parts latched in one of its two terminal conditions, and taken on the line 4—4 of FIGURE 3.
Figure 5:
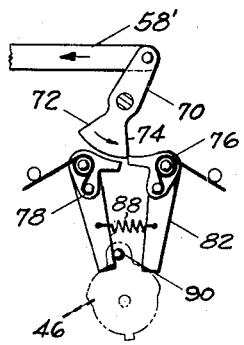
FIGURE 5 is a similar diagrammatic view of the positions of other parts of FIGURE 3 in the same condition, and taken on line 5—5 of that figure.

FIGURES 4 and 5 show the latch and release parts, in plan view, in positions corresponding to FIGURE 3. Rewind arm 28 is at its maximum counter-clockwise position, holding leaf spring 40 against pin 44 ready to throw striker plate clockwise when latch 50 is pulled away. Moreover, as shown in FIGURE 5, striker pin 90 is holding hold-closed latch 78 out of action, and is ready to strike actuator arm 82 to release latch 76 to initiate the closing motion of blades 14.

Figure 6:
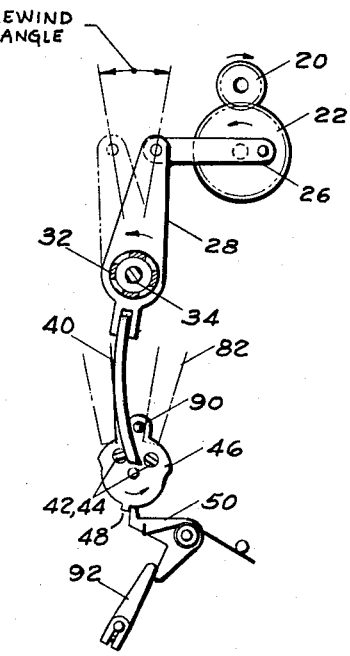
FIGURES 6 and 7 are views respectively similar to FIGURES 4 and 5, but with the parts in their opposite terminal conditions.
Figure 7:
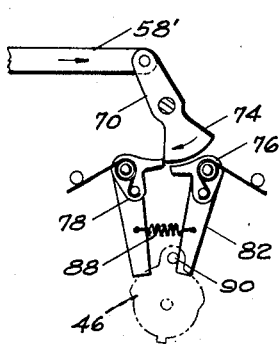

FIGURES 6 and 7 show the parts when release of the blades has been completed, and blades 14 are ready, on the next exposure, to open the shutter. Latch 76 has been released, the torsion bar unit has thrown stop cam 70 to its counter-clockwise position where it has been caught by latch 78 as shown in FIGURE 7, and, as shown in FIGURE 6, the striker plate 46 has been latched by latch 50 which drops behind the latch formation 48. Finally, motor 62 has been energized to rotate gear 22 a half turn counter-clockwise, completing the rewind of the torsion bar and tensioning leaf spring 40.

The construction of the compound torsion bar spring units 36, best shown in FIGURE 3, is especially adapted to their application as described. In addition to the inherent symmetry of the torsion bar type of spring, the folded design shown, in which the effective ends of the total spring length are both near the shutter mechanism, permits a reduction in over-all height and contributes to the mechanical simplicity in that no remote driving connections are needed. As shown, the upper end of outer cage 32 has a preferably integral top fitting 106 having an axially splined aperture which receives and secures the splined upper end of torsion rod 34 in a manner calculated to eliminate excessive stresses in these parts. However, a truly integral or welded construction of the compound unit could be employed, with attendant manufacturing problems. It is emphasized that torsional deflection is substantially uniform over the length of the cage of bars 32 and the rod 34. The aggregate spring constant of the cage bar assembly is made as nearly as possible the same as the constant for the central rod 34, to get uniform stress distribution along the length of the folded assembly.

In connection with the foregoing, it will be recalled by those skilled in mechanics that the spring constant, and ultimate strength, of a column in torsion is a function of its geometrical moment of inertia about the torsion axis. It will also be recalled that, since the entire length of the folded torsion spring is in motion during its operation, the torque required to accelerate the bar material itself, as distinguished from the driven parts, is a function of the geometrical moment of inertia thereof. Uniformalizing of the spring constant by the use of an outer bar cage and an inner rod thus contributes also to the maximization of the available torque for driving the shutter parts. Actual tests on models of the described shutter show a practically constant value of the angular acceleration at the surprising rate of a little more than one million radians per second per second. The constancy of this value throughout an exposure (or, rather, one operating phase of each blade set) demonstrates the very efficient utilization of material strength in the design, with each part operating within a certain percentage margin of its ultimate strength at all times, rather than subjected to peaks of high stress interspersed with valleys of low force and acceleration. Since the entire blade-opening (or blade closing) action of one blade set must occur within something like 1/800 second for an effective shutter speed of 1/400 second, with reasonable optical efficiency, the peak angular velocity of the blades will be very high, of the order of 600 radians per second or 6,000 r.p.m. In the design illustrated, for a 3½ inch aperture, a total blade travel of 75 degrees is employed, there being 11 degrees each of post-travel and pre-travel of the blade and an angular travel "in the aperture" of about 53 degrees. The torsion bar is designed for a peak torque of about 106 inch pounds to achieve the indicated performance.

It will further be observed, from FIGURE 3, that the positions of gear 22, when the spring unit 36 has been fully rewound in either sense, are such that the point of connection of drive arm 28 to link 26 is in alignment with the connection of link 26 to the gear, and with the gear pivot, and that these positions (see FIGURES 4 and 6) provide an on-center lock for the drive arm 28. The arm 28, and hence the lower end of cage bar 34 assembly, is thus firmly locked without any auxiliary equipment, but is free to travel under the force of rotation applied during the rewinding movement of the gear 22.

While the invention has been described in considerable detail, so as to enable those skilled in the art to make and use the same, it will be obvious that variations in these details are possible, and it is intended to claim herein all such as properly fall within the scope of the appended claims.

What is claimed is:

1. In a photographic shutter having two blade devices operating in an alternating sequence to complete an exposure for each pair of such operations, a symmetrical spring drive connected to of said blade devices, individual means for latching said spring drives in respective tensioned states to hold their blade devices respectively closed and open, means for sequentially releasing the individual latching means to initiate oscillations of said respective spring drives from their initial tensioned states through their unstressed neutral condition and transiently into partially tensioned states opposite to those last occupied, to complete respective shutter opening and shutter closing phases of one exposure, means for latching each of said spring drives in its newly acquired state of partial opposite tension, and means for further and fully tensioning each spring drive in its said newly acquired state, in preparation for a following exposure in which the opening and closing functions of said blade devices will be interchanged.

2. A photographic shutter in accordance with claim 1, in which each symmetrical spring drive comprises an elongated torsion bar having one end connected to one of said blade devices, and the other end connected to said means for further tensioning.

3. A photographic shutter in accordance with claim 2, in which each of said torsion bars comprises a central torsion rod and a surrounding cage of torsion bar elements, said rod and said cage being connected to one another at one end of the assembly and having their opposite ends connected respectively to the blade device and to the means for further tensioning.

4. A photographic shutter in accordance with claim 2, including an over-center locking arrangement between said other end of said bar and said means for further tensioning.

5. A photographic shutter in accordance with claim 1, in which said releasing means comprises a power release spring, and means for winding said release spring automatically from said means for further tensioning.

6. A photographic shutter in accordance with claim 1, in which said means for sequentially releasing the individual latching means includes an electrical trip magnet for each latching means, and switch means controlled by one of said blade devices for interchanging the electrical circuits to said magnets after each operation of said shutter.

7. In a photographic shutter having at least one blade device operating successively in opposite directions between end positions thereof, a symmetrical spring drive tensionable in opposite directions from a neutral condition and connected to said blade device to supply driving power thereto in both directions of its operation, means for releasably latching said spring drive at each of two extreme conditions in which said spring drive is oppositely tensioned, in preparation for respective spring-driven operations of said device away from said positions, means for catching said spring drive in each of the opposite partially-rewound conditions in which it arrives following its release by the latching means, and means for fully rewinding said spring drive from the condition in which it is held by said catching means, to a condition in which it is latched by said latching means.

8. In a photographic shutter having at least one reversible blade device operating successively in opposite directions between end positions thereof, a symmetrical reversible spring drive tensionable in opposite directions from a neutral condition and connected to said blade device to supply driving power thereto in both directions of its operation, means for releasably latching said spring drive at each of two extreme positions in which said spring drive is oppositely tensioned, in preparation for respective spring-driven operations of said device away from said end positions, means for catching said spring drive in each of the opposite partially-rewound positions in which it arrives following its release by the latching means, and means for fully rewinding said spring drive from the position in which it is held by said catching means, to a position in which it is latched by said latching means.

9. A blade drive for shutters, comprising a symmetrical spring operable from a fully stressed state in one direction through a neutral state of zero stress during a blade accelerating phase, and thence in a continuous movement from said neutral state, by reason of the inertia of the parts, to a partially stressed state in the opposite direction during a blade deceleration phase; and means for additionally stressing said spring an additional amount in the last-named direction, in preparation for a reverse cycle of blade operations, said symmetrical spring comprising a torsion bar having one end connected to drive a shutter blade, and having the other end connected to said means for additionally stressing.

10. A blade drive in accordance with claim 9, in which said torsion bar comprises a central torsion shaft and a torsion cage surrounding said shaft with one of its ends secured to an end of said shaft; the other ends of said shaft and said cage being connected respectively to drive a shutter blade and to receive said additional stress.

References Cited in the file of this patent

UNITED STATES PATENTS

| | | |
|---|---|---|
| 1,626,032 | Fairchild | Apr. 26, 1927 |
| 2,032,380 | Stevens | Mar. 3, 1936 |
| 2,463,206 | Robertson | Mar. 1, 1949 |
| 2,782,702 | Willcox | Feb. 26, 1957 |
| 2,803,181 | Willcox | Aug. 20, 1957 |
| 2,925,763 | Venning | Feb. 23, 1960 |